(12) United States Patent
Heidloff et al.

(10) Patent No.: US 7,693,815 B2
(45) Date of Patent: Apr. 6, 2010

(54) AUTOMATIC SUBSCRIPTIONS TO DOCUMENTS BASED ON USER NAVIGATION BEHAVIOR

(75) Inventors: Niklas Heidloff, Selzkotten (DE); Michael R. O'Brien, Westford, MA (US); Carl J. Kraenzel, Boston, MA (US); Gregory R. Klouda, Lancester, MA (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 10/967,535

(22) Filed: Oct. 18, 2004

(65) Prior Publication Data

US 2006/0085379 A1    Apr. 20, 2006

(51) Int. Cl.
*G06F 7/00* (2006.01)
(52) U.S. Cl. .............................. 707/2; 707/10; 709/217; 719/318
(58) Field of Classification Search .................. 707/2; 709/217; 719/318
See application file for complete search history.

(56) References Cited

U.S. PATENT DOCUMENTS

| | | | | |
|---|---|---|---|---|
| 5,835,087 A * | 11/1998 | Herz et al. | ............... | 715/810 |
| 6,385,619 B1 * | 5/2002 | Eichstaedt et al. | ....... | 707/104.1 |
| 6,606,619 B2 * | 8/2003 | Ortega et al. | ............... | 707/2 |
| 6,631,496 B1 * | 10/2003 | Li et al. | ........................ | 715/200 |
| 7,062,507 B2 * | 6/2006 | Wang et al. | ................... | 707/102 |
| 7,243,130 B2 * | 7/2007 | Horvitz et al. | ............... | 709/207 |
| 7,444,383 B2 * | 10/2008 | Horvitz | ........................ | 709/207 |
| 7,457,879 B2 * | 11/2008 | Horvitz et al. | ............... | 709/227 |
| 2002/0062245 A1 * | 5/2002 | Niu et al. | ........................ | 705/14 |
| 2002/0112048 A1 * | 8/2002 | Gruyer et al. | ................ | 709/224 |
| 2003/0097410 A1 | 5/2003 | Atkins et al. | | |
| 2003/0140088 A1 * | 7/2003 | Robinson et al. | ............ | 709/202 |
| 2004/0128359 A1 * | 7/2004 | Horvitz et al. | ............... | 709/207 |
| 2005/0216572 A1 * | 9/2005 | Tso et al. | ...................... | 709/218 |
| 2006/0123084 A1 * | 6/2006 | Heidloff et al. | .............. | 709/206 |
| 2006/0212427 A1 * | 9/2006 | Heidloff et al. | ................. | 707/3 |
| 2007/0011224 A1 * | 1/2007 | Mena | ........................... | 709/200 |
| 2007/0156656 A1 * | 7/2007 | Pather et al. | .................... | 707/3 |
| 2007/0214228 A1 * | 9/2007 | Horvitz et al. | ............... | 709/207 |
| 2007/0288932 A1 * | 12/2007 | Horvitz et al. | ............... | 719/313 |

\* cited by examiner

*Primary Examiner*—John R. Cottingham
*Assistant Examiner*—Alexandria Y Bromell
(74) *Attorney, Agent, or Firm*—David A. Dagg

(57) ABSTRACT

A network device such as a server monitors user behavior and provides subscriptions to documents based at least in part on that behavior. Subscription triggers include requesting at least a predetermined percentage of the entire document, requesting at least a predetermined number of pages in a document, and requesting a document at least a predetermined number of times. If documents are organized in a root and branch structure, the subscription may be triggered based on the extent to which documents are requested in the structure, e.g., triggered upon request for a branch document related to a root document. Subscriptions may also be limited to a portion of a document, such as a branch document associated with a root document.

4 Claims, 2 Drawing Sheets

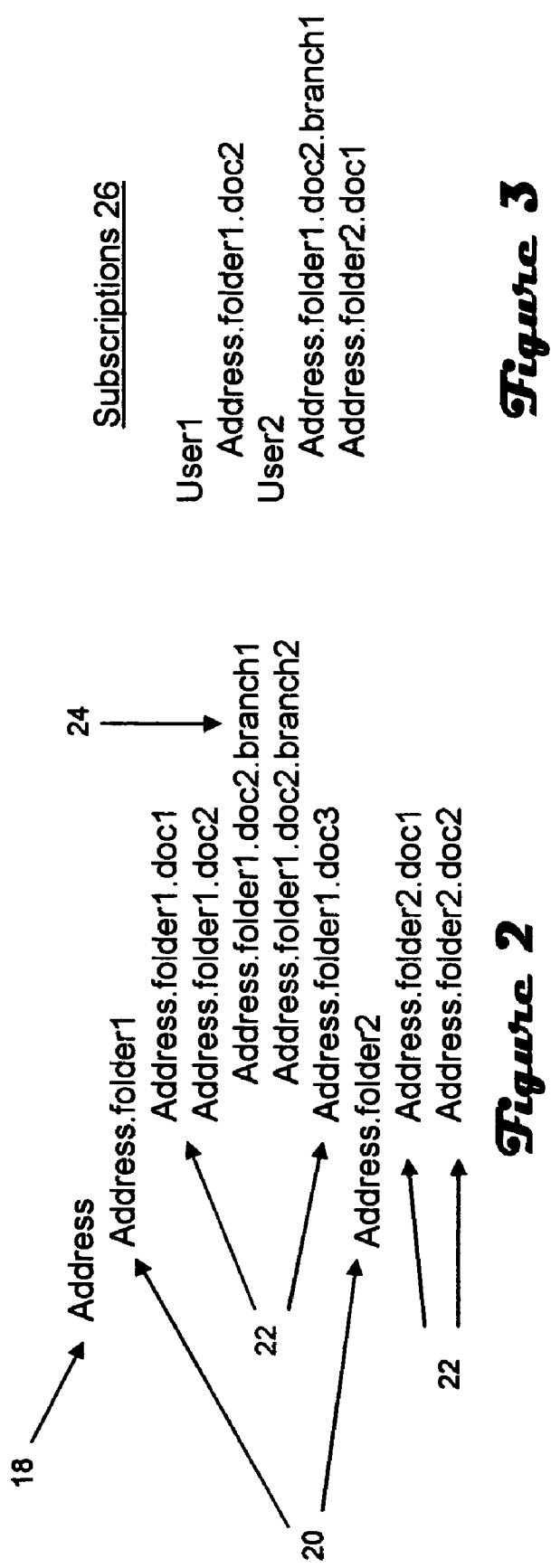

AUTOMATIC SUBSCRIPTIONS TO DOCUMENTS BASED ON USER NAVIGATION BEHAVIOR

FIELD OF THE INVENTION

This invention is generally related to information exchange via a network, and more particularly to automatic subscriptions to electronic documents.

BACKGROUND OF THE INVENTION

Shared electronic documents, forums, folders and threads (collectively, "documents") facilitate the exchange of ideas and information via a network. Network collaboration tools enable multiple users to access and contribute to a given document. Documents may be represented in a directory arranged according to subject matter to help computer users to locate documents of interest. Once a document of interest is located, a copy of or link to the document may be provided to a user's computer in response to an addressed request message such as a Uniform Resource Locator ("URL"), and the user may submit modifications which are saved in a master copy of the document stored on a source device such as a server. The modifications may then be viewed by other users who access the master copy.

Early implementations of shared network documents and collaboration tools required that documents be accessed manually. The user would prompt retrieval of a copy of the document from the server each time the user wished to view a particular document in order to determine whether the document had been modified. The user could then read the document to identify modifications. However, the user might not become aware of a change in a timely manner unless the document was frequently retrieved and read. This was recognized to be time consuming and inefficient.

It is now known to use subscriptions to provide notifications of updates. In particular, a user may submit a request for a subscription to a document so that a notification is sent to the user each time the document is changed. However, managing subscriptions can also be time consuming. For example, different collaboration tools may implement subscriptions in different ways, and a subscription tool may not be readily accessible from the document. Further, some collaboration tools provide only relatively broad subscriptions which tend to result in an undesirably great number of email updates to be sent to a subscriber.

SUMMARY OF THE INVENTION

In accordance with the present invention document subscription is automated at least in-part. A network device such as a server monitors user behavior and provides subscriptions to documents based at least in part on that behavior. For example, the server may automatically provide the user with a subscription to a document if it is determined through monitoring that the user has accessed at least a predetermined percentage of the entire document. Alternatively, the subscription may be triggered if it is determined that the user has accessed at least a predetermined number of pages in a document. The subscription may also be triggered if it is determined that the user has accessed a document at least a predetermined number of times. If documents are organized in a hierarchy, the subscription may be triggered based on the percentage or number of documents accessed at a level of the hierarchy, and the number of pages accessed in the level of the hierarchy. If the hierarchical organization is related to subject matter the triggers tend to indicate an interest in a particular subject, forum or folder. If documents are organized in a root and branch structure, the subscription may be triggered based on the extent to which documents are accessed in the structure, e.g., triggered upon access of a branch document related to a root document.

Automated subscriptions advantageously enhance efficiency. With automated subscriptions a user is not always required to explicitly request a subscription to a particular document. Unlike manual subscription tools, the user is not required to know how different collaboration platforms handle subscriptions. Subscriptions also offer the benefit of reducing the amount of time required reviewing documents, and can advantageously provide notifications to a user's email "inbox," where many users spend most of their time when actively using a computer.

In one embodiment of the invention a subscription may be limited to a portion of a document, such as a branch document associated with a root document. For example, if a user triggers an automatic subscription by retrieving a branch document in accordance with the rules described above, the subscription may be limited to the branch document. In particular, the subscription does not encompass the related root document or other branch documents. The automated subscriptions may also be limited to documents related to a particular database. For example, automated subscriptions may be limited to a workgroup database that is internal to a company, and hence not extend to everything accessed by a user. In this manner the number of email notifications is reduced and the likelihood of the update being of interest to the user is increased.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a diagram illustrating document organization to facilitate automated subscriptions.

FIG. 3 is a diagram of a subscription record.

DETAILED DESCRIPTION OF EXEMPLARY EMBODIMENTS

Figure 1:
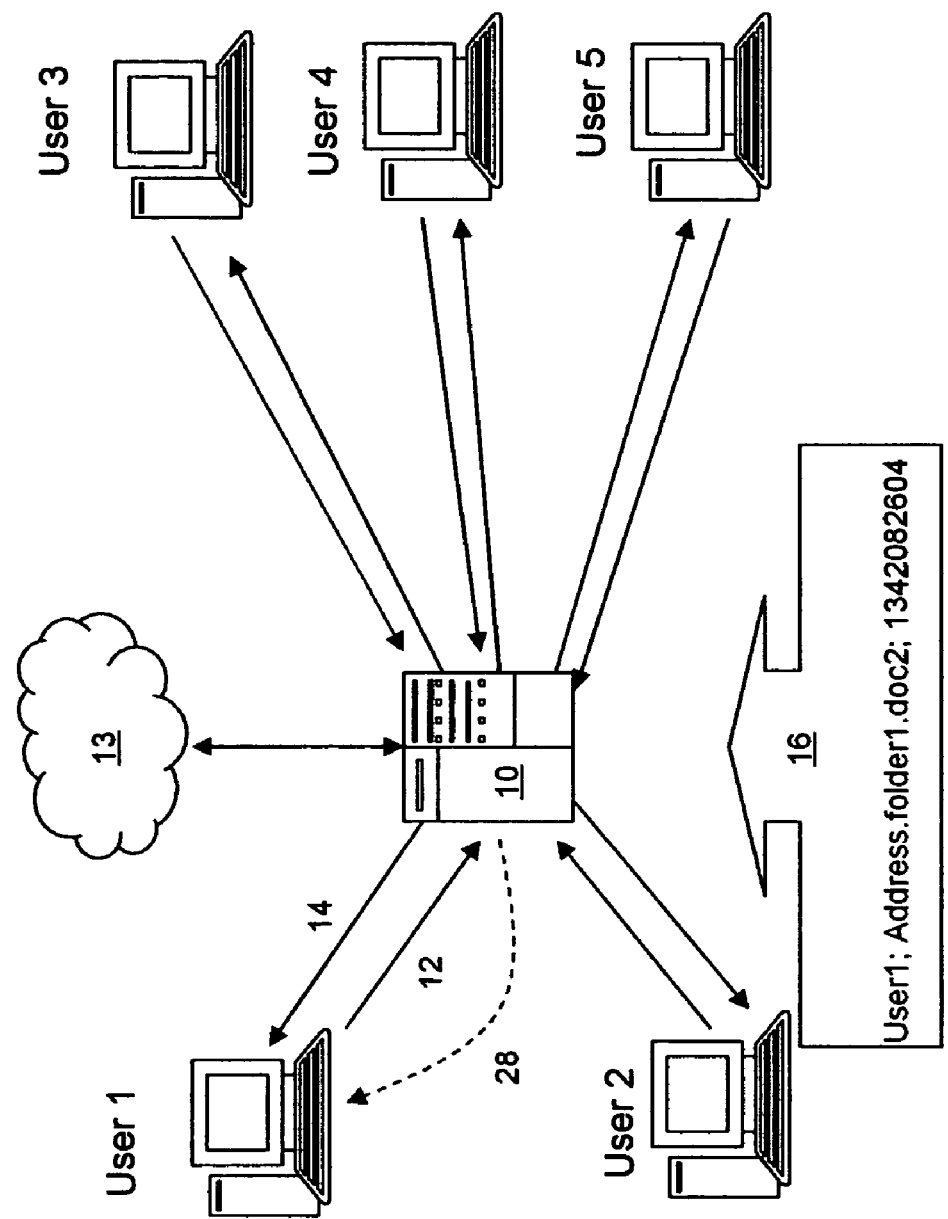
FIG. 1 is a diagram of a network in which subscriptions are at least partially automated.

The term "document" as used herein encompasses electronic documents, forums, folders and threads.

Referring to FIG. 1, a server 10 is employed to facilitate document retrieval and automated subscriptions to documents for users 1-5. In order to browse documents user 1 first prompts the server 10 to provide a copy of the document. For example, user 1 may prompt retrieval of a document by mouse-clicking a link or any other suitable method known in the art which causes the user's computer to transmit an addressed request message 12 such as a URL to the server. The request message 12 includes an address indicative of the location of the document in storage, which may be on the server or elsewhere in the network 13, provided the server 10 has information such as metadata indicating the relationship between the document and other related documents. In response to the request message the server 10 retrieves a copy of the document and transmits that copy to the user's computer in message 14.

As documents are requested and retrieved the server 10 maintains a record 16 of the transactions. For example, the server may create a record of documents retrieved by a particular user computer during a particular session. Alternatively, the server may maintain a record of documents retrieved by the user's computer spanning multiple sessions or a predetermined period of time. The record may includes an indication of the document retrieved, such as the address of the document, the user who retrieved the document, and an indication of the time at which the document was retrieved.

Referring now to FIG. 2, the server has information indicative of the relationship between documents such as a hierarchical arrangement. In the illustrated example, a base address 18 includes folders 20, each of which includes multiple documents 22. Some documents 22 includes branch documents 24. The hierarchical structure may be indicative of the subject matter of the documents. For example, all documents in folder1 may be related to the same general subject matter, and the branch documents Address.folder1.doc2.branch1 and Address.folder1.doc2.branch2 may be more detailed documents relating to the subject matter of the root document Address.folder1.doc2 with which they are related.

Referring now to FIG. 1 and FIG. 2, the record 16 generated in response to user behavior and the data indicative of the relationship between documents are employed to provide subscriptions. Various user behaviors with respect to the documents may be employed to trigger a subscription. For example, the server 10 may automatically provide user 1 with a subscription to document Address.folder1.doc2 if it is determined through monitoring that the user device has requested at least a predetermined percentage of the entire document. Alternatively, the subscription may be triggered if it is determined that the user device has requested at least a predetermined number of pages in document Address.folder1.doc2. Alternatively, the subscription may be triggered if it is determined that user 1 has requested document Address.folder1.doc2 at least a predetermined number of times. A subscription may also be triggered based on percentage of viewing of a level of the hierarchy, e.g., the folder level, and number of pages requested in a given level of the hierarchy. The subscription may also be triggered based on the extent to which documents are requested in the structure, e.g., triggered upon request for a branch document related to a root document. If the user retrieves a directory then a subscription may be triggered when the user opens a document or at least a predetermined number of documents in that directory.

Referring to FIG. 1 and FIG. 3, the server 10 maintains a record 26 of document subscriptions for each user. Once a subscription is triggered the server adds an entry to the record 26 indicative of the new subscription. If the indicated document is subsequently modified by another user the server transmits a notification 28 to each user having a subscription to the document. The notification 28 may be an email message, Session Initiation Protocol ("SIP") message or other form of notification. The notification may indicate how the document has been modified, such as by including the modified portions in the body of the notification, or simply indicate that a modification has been made.

Referring again to FIG. 2, subscriptions may be limited in a manner calculated to limit notifications to modifications of probable interest to the user and limit the overall number of notifications sent to the user in order to mitigate information overload. One technique for limiting the scope of a subscriptions is to limit a subscription to a portion of a document, such as a branch document associated with a root document. For example, if a user triggers an automatic subscription by retrieving branch document Address.folder1.doc2.branch1 in accordance with the rules described above, the subscription may be limited to that branch document. In particular, the subscription does not encompass the related root document Address.folder1.doc2 or other branch documents. In this manner the number of email notifications is reduced and the likelihood of the update being of interest to the user is increased.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

What is claimed is:

1. A computer-implemented method for providing a subscription to a document that is available to a user via a network, wherein the document is associated with a level in a hierarchy having multiple levels, comprising the steps of:
   monitoring user behavior;
   automatically triggering a subscription to the document, responsive to the monitoring, when the user exhibits a predetermined behavior with respect to the document, by
      automatically triggering a subscription to the document when the user accesses at least a predetermined percentage of documents at the level of the document in the hierarchy,
      automatically triggering a subscription to the document when the user accesses at least a predetermined number of documents at the level of the document in the hierarchy,
      automatically triggering a subscription to the document when the user accesses a predetermined number of pages at the level of the document in the hierarchy, and
      automatically triggering a subscription to the document when the user accesses at least a predetermined percentage of the total document;
   wherein the subscription causes an electronic mail notification to be sent to the user responsive to another user subsequently modifying the document; and
   wherein the electronic mail notification indicates how the document has been modified by including a plurality of modified portions of the document in the body of the notification.

2. The method of claim 1 including the further step of automatically triggering a subscription to the document if the user accesses at least a predetermined number of pages of the document.

3. The method of claim 2 including the further step of automatically triggering a subscription to the document if the user accesses the document a predetermined number of times.

4. The method of claim 3 wherein the multiple levels in the hierarchy comprise folders, wherein the document is a branch document associated with a root document, and including the further step of limiting the subscription to the branch document.

* * * * *